June 24, 1930. R. T. JENNEY 1,768,360
MICROMETER SPRING BUFFER STOP
Original Filed Aug. 3, 1925   3 Sheets-Sheet 1

INVENTOR
Robert T. Jenney
BY Joseph Dugan
ATTORNEY

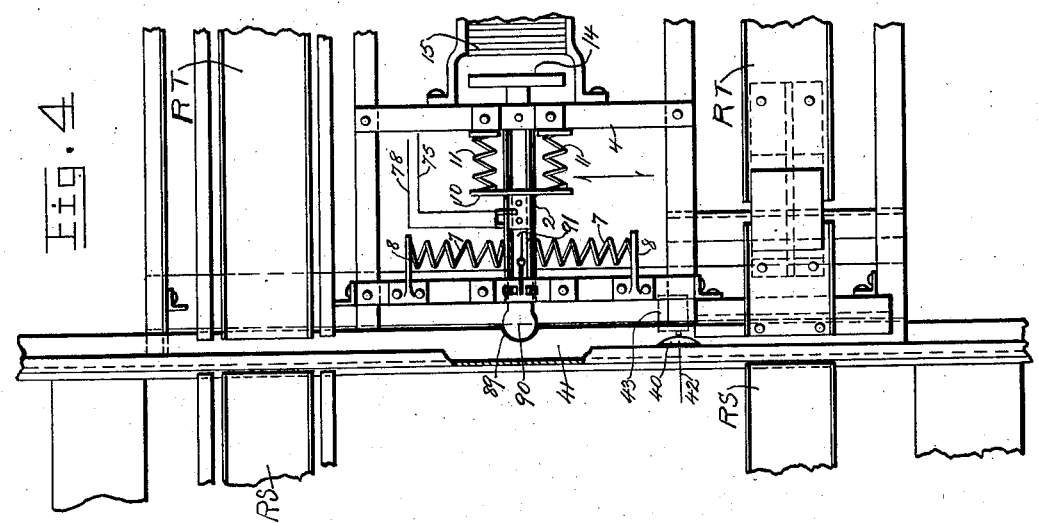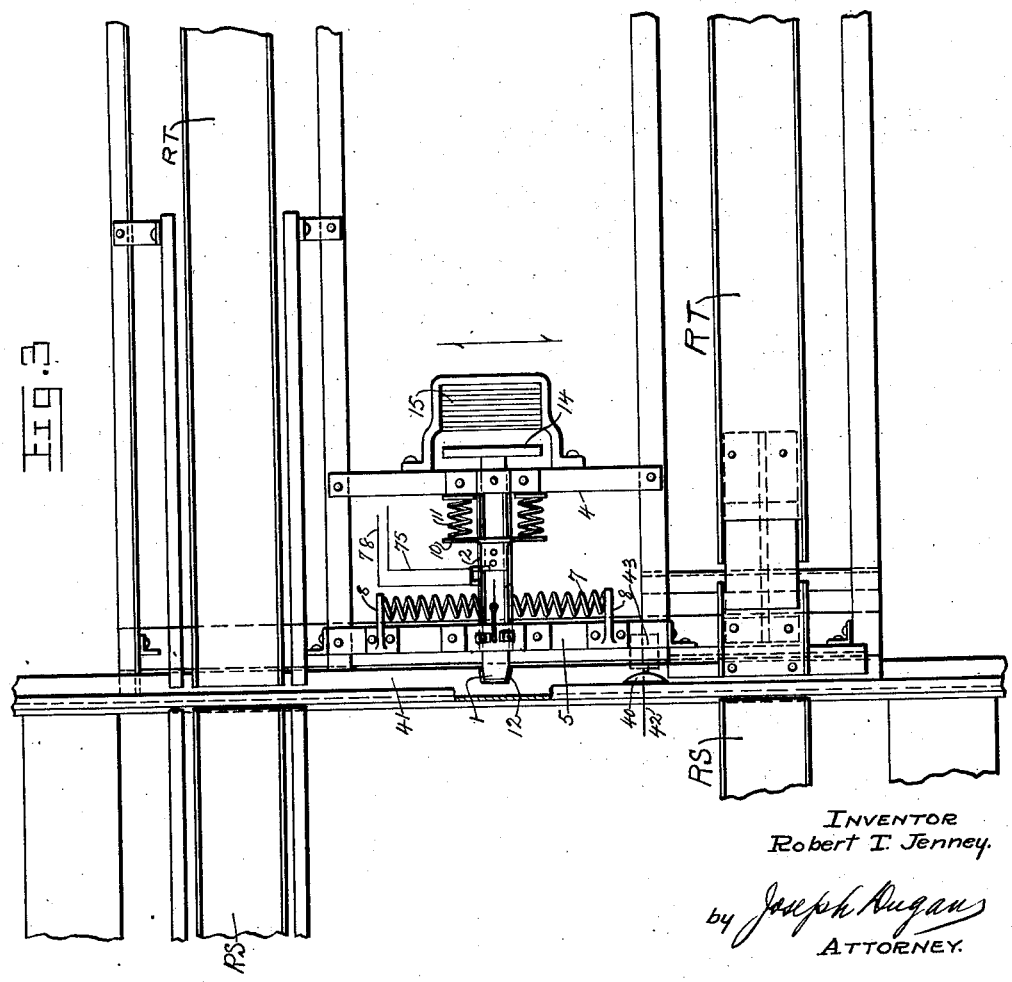

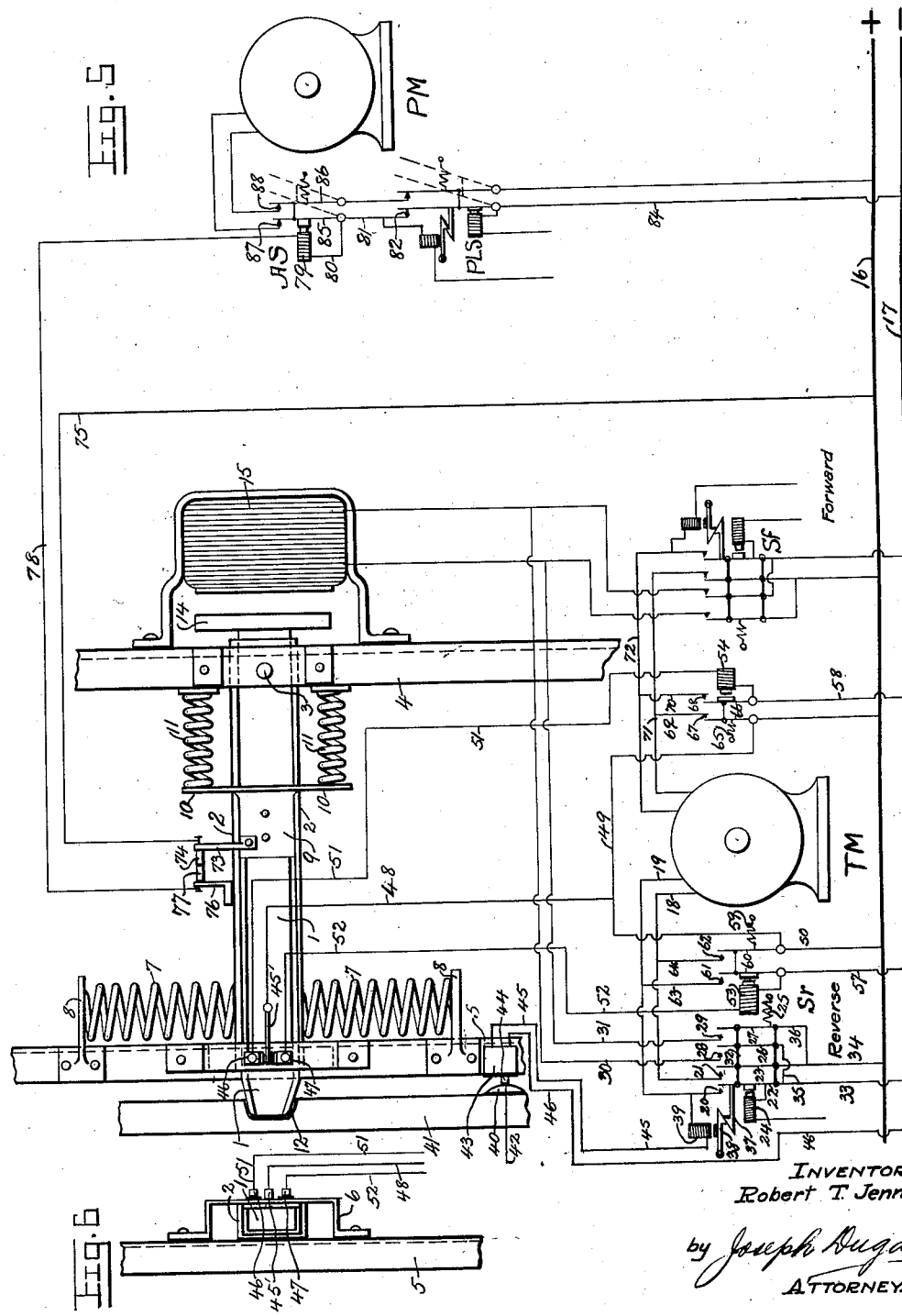

Patented June 24, 1930

1,768,360

UNITED STATES PATENT OFFICE

ROBERT T. JENNEY, OF LOS ANGELES, CALIFORNIA, ASSIGNOR, BY MESNE ASSIGNMENTS, TO CROSS PARKING SYSTEMS, INC., OF CHICAGO, ILLINOIS, A CORPORATION OF ILLINOIS

MICROMETER SPRING-BUFFER STOP

Application filed August 3, 1925, Serial No. 47,879. Renewed August 13, 1928.

This application is a continuation-in-part of my U. S. application for Automatic vehicle storage system, filed April 18, 1925, Serial Number 24,305.

The system disclosed in said application comprises a skelton structure divided into superposed rows of vehicle receiving stalls arranged on each side of an alleyway in which guide rails are fixed adjacent each row of stalls to support and guide a vehicle carrying trolley automatically movable from a fixed loading station to and from any desired stall in the system. In the operation of the system, it becomes necessary, when the trolley is delivering a vehicle to a stall or taking one from it, to position the trolley so that the vehicle guiding runways thereof are exactly alined with corresponding runways in the stall. It is a particular object of the present invention to provide a system of the type mentioned with means to ensure the automatic and exact positioning of the trolley relative to any desired stall to ensure exact alinement of the runways in stall and trolley.

The broad object of the invention, however, is to provide two relatively movable bodies with automatically operable means for positioning one in an exact predetermined position relative to the other.

Incidental to the carrying out of the objects of the invention just named, it also becomes necessary in the operation of the system, to prevent the simultaneous operation of two motors intended to control the movements of parts of the system which must not be moved except when other parts are at rest. This prevention of simultaneous motor operation constitutes another particular object of the present invention; which, however, must not be considered as limited to use in a vehicle storage system or in anything else.

Other objects of the invention will appear as the detailed description of the invention proceeds.

In the drawings:

Figure 3 is a fragmentary plan view of my spring buffer stop;

Figure 4 is a similar view of a modification of the stop shown in Figure 3; and

Figure 5 is a diagrammatic plan view of my stop mechanism shown as operatively connected by suitable wiring to interlocking motors which control the movements of the trolley, the stop mechanism, and the movements of a vehicle on to or off the trolley.

Figure 6 is a fragmentary detail in end elevation of the top shown in Figure 5.

Figure 1:
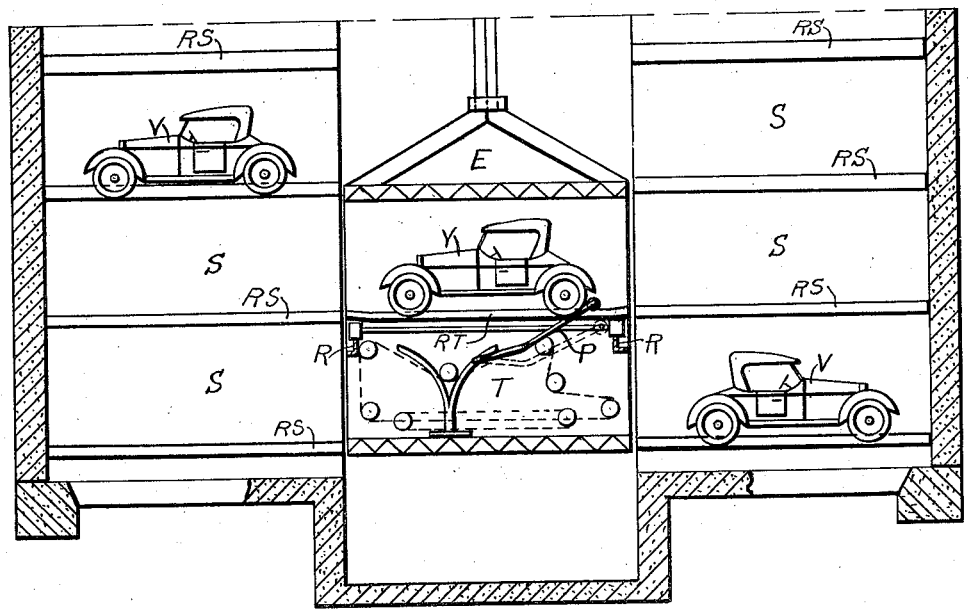
Figure 1 is a diagrammatic sectional elevation of a system in which my invention is adapted to be used.
Figure 2:
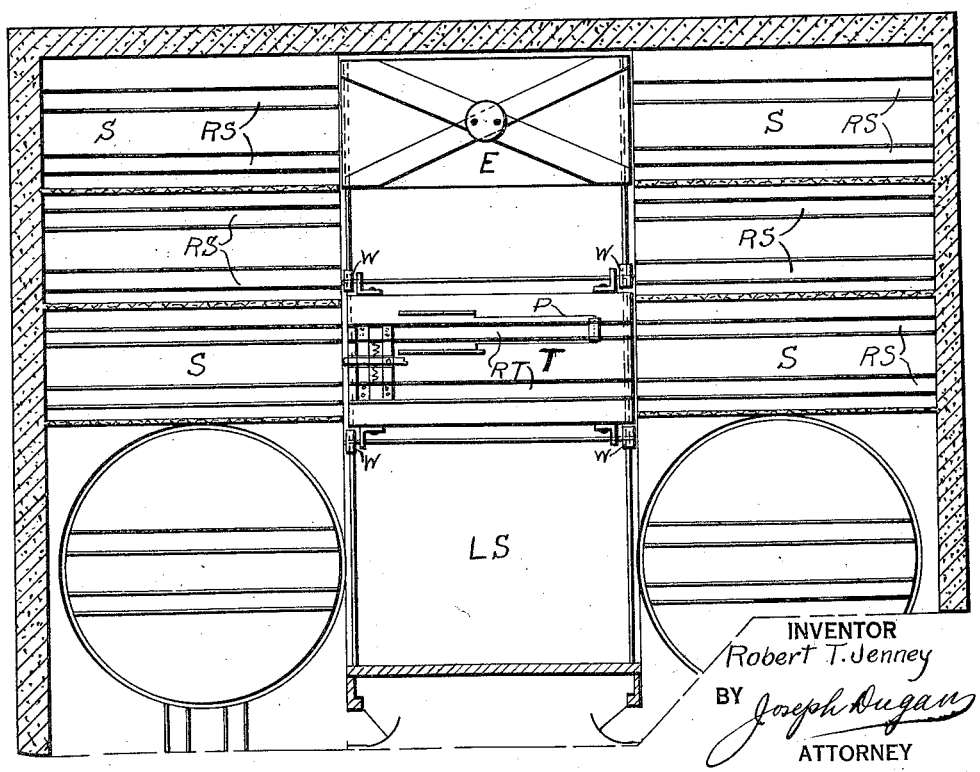
Figure 2 is a diagrammatic plan view of the same system.

The system comprises a skelton structure divided into rows of superposed stalls S in which runways RS are provided to receive vehicles V for storage. These vehicles V are moved to their stalls by a trolley T constructed to be automatically moved from a central loading station LS on the street level to and from an elevator E and onto guide rails R at the level of the vehicle receiving runways RS of each row of stalls. A motor TM (Fig. 5) through suitable gearing (not shown) operates the trolley wheels W (Fig. 2) to move the trolley toward and from any desired stall, and a motor PM (Fig. 5) operates a pusher lever P to move a vehicle from the trolley into a stall.

The operating details of the trolley and pusher mechanisms constitute no part of the present invention; they are fully disclosed in my copending application mentioned above. In the system described in that application, nothing is disclosed for bringing the trolley to a stop in an exactly predetermined position relative to a stall, the stopping of the trolley, when the latter reaches the desired stall, being effected merely by the stopping of the trolley motor TM through cooperating contacts fixed to the stall and trolley, respectively. If the trolley stopped instantly with the stopping of the trolley motor TM, there would be no need for the present invention in the system. The momentum of the moving trolley, however, is likely to carry it past the desired position, even after the stopping of the motor TM, and it then becomes necessary to start the motor in the opposite direction to bring the trolley back to the desired position. Before the trolley is finally brought to rest with the runways thereof exactly alined with the runways in the stall, it may become necessary to start and stop the motor several times, the trolley oscillating past the desired point, with oscillations decreasing in amplitude to zero, until the trolley is brought to rest.

The means for positioning the trolley with its vehicle runways RT exactly alined with the stall runways RS comprise a stop plate 1 mounted to slide freely but snugly in the channeled guide member 2 which is pivoted at one end by the pivot 3 to a cross brace 4 forming part of the framework of the trolley T.

The free end of member 2 is supported by the cross brace 5 to slide freely in a bracket 6 suitably secured to the brace 5 and is normally centered in bracket 6 by spring buffer springs 7 secured between brackets 8 projecting from and fixed to the cross brace 5.

The stop plate 1 has fixed thereto a T-shaped plate 9, the ends 10 of which serve as abutments for compression springs 11 which press against the cross brace 4 to keep plate 1 normally projected from the trolley and into locking engagement with a notch 12 provided in one of the horizontal members 41 of the stall structure. The plate 1 and the notch 12 are so located on the trolley and stall structure, respectively, that the trolley and stall runways are exactly alined when the notch and plate are in locking engagement and the trolley is at rest.

In order to withdraw the plate 1 from locking engagement with the notch 12, the plate is provided at one end with a crosshead 14 adapted to be attracted by the electromagnet 15 fixed to brace 4 and to be held clear of member 13 when the magnet 15 is energized, as it always is when the trolley motor is in operation to move the trolley in one direction or the other past the stalls. This means that plate 1 can be in locking engagement with the notch 12 only when the motor TM is stopped and the trolley is at rest with its runways RT exactly alined with the stall runways RS.

The trolley motor TM is conveniently fixed on the trolley framework, and is connected suitably by any available mechanism to rotate the wheels W in one direction or the other to move the trolley in any desired direction on the rails R. The motor TM is wired through the latch switches S$^r$ and S$^f$ to the mains 16 and 17 to move the trolley on the rails R toward and from the elevator E. For convenience of description, movement of the trolley toward the elevator E is considered as "forward" while movement therefrom is considered as "reverse".

As fully disclosed in my copending application, the motors TM and PM are started and stopped by cooperating contact members arranged in predetermined locations on the relatively movable parts of the system; to start the trolley motor TM to move the trolley toward any desired stall; to stop the motor TM when the trolley reaches the stall; to start the pusher motor PM, immediately after the stopping of the trolley motor, in vehicle transferring movement from trolley to stall or from stall to trolley; and, finally, to start the trolley motor to move the trolley away from the stall back to the loading station.

As shown in Figure 5, the trolley motor TM is connected for "reverse" operation by the wires 18 and 19 to contacts 20 and 21, respectively, adapted to contact with the pivoted contact bars 22 and 23, respectively, when the latter are drawn over into contact position by energization of the locking magnet 24. This magnet 24 is connected for energization through one of a pair of contact members (not shown) of the system to move bars 22 and 23 against the tension of the spring 25, which normally maintains said bars out of contact with contacts 20 and 21 at the same time as it holds bars 26 and 27 from contact with contacts 28 and 29 which terminate the ends of magnet wires 30 and 31, respectively, a cross bar 32 being pivoted to all four contact bars to cause their simultaneous movement into and out of contact positions. Wires 33 and 34 connect the bars 22 and 23 directly to the feed mains 16 and 17, and wires 35 and 36 connect bars 26 and 27 to said mains through the wires 33 and 34, respectively.

When the locking magnet 24 is energized, bars 22, 23, 26 and 27 will be drawn into contact with contacts 20, 21, 28 and 29, respectively, to close the circuits from the mains 16 and 17 to the trolley motor TM and the magnet 15. So long as these circuits are closed, it will be obvious, that magnet 15 will be energized to draw plate 1 from its projected locking position and keep it withdrawn, and that the trolley motor TM will be operated to move the trolley out from the elevator toward the desired stall.

The contact bar 22 has a notched latch rod fixed thereto to slide under and be held by a cooperating latch rod 38 to hold all the contact bars 22, 23, 26 and 27 in circuit closing position. The contact members operating the magnets of these latch switches are constructed so as to break the magnet energizing circuit immediately after making it; hence the necessity of providing the contact bars of these switches with the cooperating latching bars to hold the contact bars in circuit closing position as long as may be necessary to move the trolley from the elevator or loading station to a desired stall.

When the trolley reaches its stall, it becomes necessary to release the latch bar 37 to stop the operation of the motor TM. This release is effected by energizing the release magnet 39 to withdraw bar 38 from locked engagement with bar 37 and permit the spring 25 to draw all four of the contact bars from contact position and break the circuits from the mains 16 and 17 through the motor TM and the magnet 15. One set of these latch-magnet operating contact members is shown in Figure 5 as connected to the releasing magnet 39 to energize the latter as soon as the trolley reaches the desired location at a stall. Each set of these contact members includes an insulated contact plate 40 suitably secured to a fixed part 41 of the stall structure and having a wire 42 leading therefrom to a key-controlled source of electrical energy. A contact box 43, fixed to the trolley, has a contact rod yieldingly projected from the box to contact with all contact plates 40 which the trolley may pass on its way from the loading station to the desired stall. The internal mechanism of each contact box 43 is electrically connected either to a locking magnet or to a release magnet, depending upon the operation to be performed, and is so constructed that when the rod 44 contacts with a "hot" contact plate 40, the magnet controlled by said box is immediately energized. In this particular case, the contact box controls, through wires 45 and 46, the releasing magnet 39, the energization of which raises latch bar 38 from locking engagement with bar 37, thereby permitting spring 25 to draw all the contact bars 22, 23, 26 and 27 out of contact with their respective contacts and break the circuits from the mains through the trolley motor TM and the magnet 15.

Immediately upon deenergization of the magnet 15, the springs 11 force the locking plate 1 toward the fixed member 41 and into the notch 12. If the inertia of the trolley should carry it past the position where the trolley and stall runways are exactly alined, the guide member 2 will be moved, by engagement of the side end of plate 1 with a side of the notch 12, to swing about the pivot 3 and cause contact between one side of the spring contact plate 45', fixed on plate 1, and one of the contacts 46 and 47 fixed on bracket 6 on each side of plate 45'. Wires 48 and 49 connect the contact plate 45' electrically to the ground wire 16. Wires 51 and 52 connect contacts 46 and 47 to the release magnets 53 and 54 which control the switches 55 and 56 for operating the trolley motor TM in reverse and forward directions, respectively, and wires 57 and 58 connect the reverse and forward magnets 53 and 54 to the return main 17.

A spring 59 normally maintains the contact bar 60 out of contact with contacts 61 and 62 on wires 63 and 64, respectively, tapped to the reverse feed wires 18 and 19 of the trolley motor TM. A spring 65 similarly holds bar 66 normally out of contact with contacts 67 and 68 on the wires 69 and 70, respectively, tapped to the forward feed wires 71 and 72 of the motor TM.

It will be obvious from inspection of Figure 5 that the trolley motor TM will be operated in one direction or the other according to which of the contacts 46 and 47 is moved into contact with the plate 45' by the engagement of the tapered end of stop plate 1 with one side or the other of the notch 12 as the trolley overshoots its desired location relative to the stall, and that operation of the motor TM in one direction or the other will continue until the trolley finally comes to rest with its runways exactly alined with those of the stall.

As fully disclosed in my copending application, the pusher bar P is started automatically in operation, as soon as the trolley arrives at the desired stall, to move the pusher roller at its free end across the trolley runway into the stall and back again to its starting position immediately below one end of said runway. The specific details of the pusher mechanism form no part of the present invention. It will be obvious, however, that the pusher must be prevented from operation while the trolley is in motion on its rails R. To prevent this operation the plate 1 has an arm 73 fixed thereto which carries at its free end a contact 74 connected by a wire 75 to the ground wire 16. An arm 76 is fixed to one side of the channeled guide member 2 and carries a contact 77 positioned to make contact with contact 74 only when the stop plate 1 is seated in locking engagement with the notch 12, which engagement, obviously, can occur only when the trolley motor is stopped and the trolley is at rest.

The contact 77 is connected by wire 78, through switch magnet 79, wires 80 and 81, contact 82, contact bar 83 and wire 84 to the return main 17. In the rest position shown in Figure 5, with the pusher motor latch switch locked to operate the pusher motor, it is clear that the circuit from mains 16 and 17 through magnet 79 is closed, and that contact bars 85 and 86 will be held in contact with their respective contacts 87 and 88 to close the circuit from the mains 16 and 17 to the pusher motor PM. It will also be clear from the drawing that the pusher motor cannot be operated unless both the latch switch PLS and the auxiliary magnetic switch AS are in operation to maintain all contacts closed.

In Figure 5, the mechanism is indicated as it would be with all the trolley motor switches released, and with the pusher motor switches locked to operate the pusher motor and the mechanism controlled thereby. These are the positions the various parts would assume after the trolley had reached its desired stall and had been brought to rest in locked position by the operation of the spring buffer mechanism. The details of the mechanism for moving the trolley along the rails R to the desired stall and the details of the pusher mechanism do not enter into the present invention; which is limited, particularly, to the means for causing exact positioning of the trolley relative to its stall and for preventing operation of the pusher motor until the trolley is brought to rest exactly in the desired position; and, broadly, to means for positioning one body in exact predetermined position relative to another body, and to means for preventing simultaneous operation of two motors connected for automatic operation to the same feed mains.

In the modification shown in Figure 4, the notch 89 is shaped as an arc of a circle to cooperate with the circular end 90 formed on the end of the locking plate 91. The other details of this modification are identical with those previously described. This arcuate locking construction obviously forms a real micrometer stop, since the movable body can be at rest only when the centers of the locking notch 89 and the circular end 90 of the stop plate coincide.

I claim:—

1. Two bodies, a motor on one of said bodies for moving it relative to the other, a stop on said body movable into and out of locking engagement with the other body, means on said stop for operating said motor when said body passes a predetermined position on the other body, and means operable by the operation of said motor for withdrawing said stop from locking engagement with the other body.

2. A fixed body, a body movable relatively thereto, a stop on one of said bodies, means for moving said stop into engagement with the other of said bodies, mechanism for moving said movable body, and means controlled by said mechanism for holding said stop out of engagement with said other body during the operation of said mechanism.

3. A fixed member, a body movable relative to said member, means for moving said body, a stop on said body, means tending to force said stop against said member, and means operatively connected to said moving means to withdraw said stop from contact with said member during the operation of the moving means.

4. A fixed member having a notch therein, a body slidable along said member, means for sliding said body, a stop on said body, means tending to force said stop against said member and into said notch, and means operatively connected to said sliding means for withdrawing said stop from said member and for holding it withdrawn during the operation of the sliding means.

5. A stall, a carrier, means for locking the carrier to said stall, vehicle moving means on said carrier, and means actuated by said locking means operative to prevent the operation of said moving means except when the carrier is locked to said stall.

6. A rail, a carrier, means for moving said carrier along said rail, a stop on said carrier, means tending to force said stop into locking contact with said rail, means operatively connected to said moving means for holding said stop out of contact with said rail during the operation of said moving means, vehicle moving means on said carrier, and means connected to said stop for preventing simultaneous operation of said carrier and vehicle moving means.

7. A vehicle carrier, a motor for moving said carrier, vehicle moving means permanently mounted on said carrier, a second motor for operating said vehicle moving means, and means to prevent the simultaneous operation of said motors.

8. In a vehicle storage system, a plurality of storage stalls on a horizontal plane facing each other in spaced apart relation forming a path-way between, a vehicle carrier adapted to move in said path-way, means for moving a said carrier into proximate alignment with any stall, and mechanism operative to move the carrier into exact alignment with the proximate stall.

9. In a vehicle storage system a plurality of storage stalls on a horizontal plane facing each other in spaced apart relation forming a path-way between, a vehicle carrier adapted to move in said path-way, means for moving said carrier adjacent in one of said stalls, and a stopping zone associated with each stall operative to bring about the movement of the carrier into alignment with the stall when the carrier moves past the selected stall.

10. In a vehicle storage system a plurality of storage stalls on a horizontal plane facing each other in spaced apart relation forming a path-way between, a vehicle carrier adapted to move in said path-way, means for moving said carrier adjacent in one of said stalls, and a stopping zone associated with each stall operative to bring about the movement of the carrier into alignment with the stall when the carrier stops before being aligned with the selected stall.

11. In a vehicle storage system, a plurality of stalls on a horizontal plane facing each other in spaced apart relation to form a path-way between, a pair of spaced apart vehicle wheel guiding tracks in each stall a vehicle carrier having a pair of spaced apart vehicle wheel guiding tracks thereon adapted to move in said path-way, means for moving said carrier into proximate alignment with any stall, a stopping zone associated with each stall and means operative in said stopping zone to align the vehicle wheel guiding tracks of said carrier exactly with the vehicle wheel guiding tracks of the selected stall.

12. In a vehicle storage system, a plurality of stalls on a horizontal plane facing each other in spaced apart relation to form a path-way between, a vehicle carrier adapted to move in said path-way, a motor for moving said vehicle carrier into proximate alignment with any stall, a stopping zone associated with each stall, and a circuit for said motor controlled by said stopping zone, to bring said carrier into exact alignment with the selected stall if the carrier stops in the stopping zone of the stall.

13. In a vehicle storage system, a plurality of stalls on a horizontal plane facing each other in spaced apart relation to form a path-way between, a vehicle carrier adapted to move in said path-way, vehicle moving mechanism on said carrier, means for moving said carrier into proximate alignment with any stall, a stopping zone associated with each stall, means controlled through said stopping zone when said carrier comes to rest in one of the stopping zones for aligning the carrier with the associated stall and means then operative for operating said vehicle moving mechanism.

14. In a vehicle storage system, a plurality of stalls on a horizontal plane facing each other in spaced apart relation to form a path-way between, a vehicle carrier adapted to move in said path-way vehicle moving mechanism on said carrier, means for moving said carrier into proximate alignment with any stall, a stopping zone associated with each stall, means controlled through said stopping zones for aligning the carrier with the associated stall and means operative as a result of this aligning action to initiate the operation of said vehicle moving mechanism.

15. In a vehicle storage system, a storage stall, a vehicle carrier adapted to be moved horizontally into proximity of said stall, a stopping zone associated with said stall and means controlled by said stopping zone when said carrier stops therein for bringing it into exact alignment with the stall.

16. In a vehicle storage system, a stall, a vehicle carrier means for moving said carrier into proximity of said stall, means associated with said stall then operative to control the movement of the carrier into exact alignment with the stall, and vehicle moving mechanism operative as a result of such aligning action.

17. In a vehicle storage system, a stall, a vehicle carrier, mechanism for moving said carrier into alignment with said stall, vehicle moving mechanism permanently associated with said carrier and adapted to move a vehicle from a carrier to a stall, and means operative as a result of the alignment of the carrier and stall to initiate the operation of the mechanism.

18. In a vehicle storage system, a stall, a vehicle carrier mechanism for moving said carrier into alignment with said stall, vehicle moving means mounted on said carrier for moving a vehicle from the carrier to the stall, electrical switching mechanism controlling said mechanism and means and adapted to prevent their simultaneous operation.

19. In a vehicle storage system, a storage stall, a vehicle carrier, mechanism for moving said carrier into alignment with said stall, vehicle moving means mounted on said carrier operative as a result of such aligning action, and electrical switching mechanism controlling the operation of the first mentioned mechanism and said vehicle moving means.

In testimony whereof I have signed my name to this specification.

ROBERT T. JENNEY.